US011146936B2

(12) United States Patent
Lu et al.

(10) Patent No.: US 11,146,936 B2
(45) Date of Patent: Oct. 12, 2021

(54) METHOD AND BLUETOOTH DEVICE FOR INDICATING FUNCTION OF BLUETOOTH DEVICE VIA BROADCAST DATA

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 16/957,791

(22) PCT Filed: Nov. 27, 2018

(86) PCT No.: PCT/CN2018/117614
§ 371 (c)(1),
(2) Date: Jun. 25, 2020

(87) PCT Pub. No.: WO2019/128596
PCT Pub. Date: Jul. 4, 2019

(65) Prior Publication Data
US 2021/0067936 A1 Mar. 4, 2021

(30) Foreign Application Priority Data
Dec. 27, 2017 (CN) .......................... 201711441353.5

(51) Int. Cl.
*H04W 4/80* (2018.01)
*H04W 76/14* (2018.01)
*H04W 4/06* (2009.01)

(52) U.S. Cl.
CPC .............. *H04W 4/80* (2018.02); *H04W 4/06* (2013.01); *H04W 76/14* (2018.02)

(58) Field of Classification Search
CPC ................................ H04W 4/80; H04W 76/14
See application file for complete search history.

(56) References Cited

U.S. PATENT DOCUMENTS

| 2016/0150357 A1* | 5/2016 | Jung | ................. H04W 52/0206 455/41.1 |
| 2016/0360345 A1 | 12/2016 | Kim et al. | |
| 2017/0055305 A1* | 2/2017 | Kurian | ................. H04W 8/005 |

FOREIGN PATENT DOCUMENTS

| CN | 101026525 A | 8/2007 |
| CN | 101809947 A | 8/2010 |

(Continued)

OTHER PUBLICATIONS

International Search Report dated Feb. 27, 2019 in corresponding International application No. PCT/CN2018/117614; 4 pages.

(Continued)

*Primary Examiner* — Tuan H Nguyen
(74) *Attorney, Agent, or Firm* — Maier & Maier, PLLC

(57) ABSTRACT

Provided are a method and a bluetooth device for indicating a function of the bluetooth device via broadcast data. The method includes: organizing, by the bluetooth device, bluetooth broadcast data according to a determined working mode; obtaining, by the bluetooth device, terminal device information from a connecting request in a case that the connecting request is received, and determining whether there exists information in an information-matched list matching with terminal device information, if yes, building a connection and communicating with a terminal device which sends the connecting request, ending the method; otherwise, determining the working mode, matching with and communicating with the terminal device according to the matching type, and writing the terminal device information into the information-matched list and ending the method in a case that the working mode is a matching mode; keeping broadcasting in a case that the working mode is a non-matching mode.

22 Claims, 3 Drawing Sheets

(56) References Cited

FOREIGN PATENT DOCUMENTS

| | | |
|---|---|---|
| CN | 104768125 A | 7/2015 |
| CN | 104967971 A | 10/2015 |
| CN | 105490712 A | 4/2016 |
| CN | 105933039 A | 9/2016 |
| CN | 106658382 A | 5/2017 |
| CN | 107257540 A | 10/2017 |
| CN | 108200559 A | 6/2018 |

OTHER PUBLICATIONS

Chinese Office Action dated Sep. 11, 2019 in corresponding application No. 201711441353.5; 5 pgs.
Chinese Office Action dated Jan. 19, 2020 in corresponding application No. 201711441353.5; 5 pgs.
Yuchen Information, "Understand the Basic Knowledge of Hacker Attack and Defense", 7 Days to Master Hacking, published on Feb. 28, 2015, pp. 3-93.
Jin, "Operation Mode and Procedure Selected from BLE Low Power Bluetooth Technology Development Guide", published on Jan. 31, 2020, pp. 140-147.
Liu, "Universal Access Application", Bluetooth Technology Application, published Nov. 30, 2011, 25 pages total, including partial English-language translation.

* cited by examiner

METHOD AND BLUETOOTH DEVICE FOR INDICATING FUNCTION OF BLUETOOTH DEVICE VIA BROADCAST DATA

CROSS-REFERENCE TO RELATED APPLICATIONS

This application is a National Stage of International Application No. PCT/PCT/CN2018/117614, filed on Nov. 27, 2018, which claims priority to CN Patent Application No. 201711441353.5, filed on Dec. 27, 2017, both of which are hereby incorporated by reference in their entireties.

TECHNICAL FIELD

The present disclosure relates to the field of wireless communication, and in particular, to a method and a bluetooth device for indicating a function of the bluetooth device via broadcast data.

BACKGROUND

The BLE (Bluetooth Low Energy) bluetooth technology is widely applied in data transmission between bluetooth devices and mobile devices, such as mobile phones, laptops or PADs because of its advantages of shorter time for wireless starting, quicker connection building and lower dissipation at peak.

In prior art, when performing data broadcast, the bluetooth device is in a matching mode, i.e., the bluetooth device is at a status in which it can be detected by terminal devices within a limited distance, and all the terminal devices within the limited distance can connect with it; in this way, the bluetooth device may be inevitably attacked by a strange device or an illegal device, thus, the safety of the bluetooth device is threatened.

SUMMARY

To solve the disadvantages in prior art, there is provided a method and a bluetooth device for indicating a function of the bluetooth device via broadcast data.

A method for indicating a function of a bluetooth device via broadcast data, includes:

step S1, determining, by a bluetooth device, a working mode; in a case that the working mode is a matching mode, organizing and broadcasting bluetooth broadcast data according to an address of the bluetooth device, universal discoverable identifier and matching type; in a case that the working mode is a non-matching mode, organizing and broadcasting the bluetooth broadcast data according to the address of the bluetooth device and a non-discoverable identifier;

step S2, determining, by the bluetooth device, whether a connecting request is received within a preset duration, if yes, stopping broadcasting and executing step S3; otherwise, ending the method;

step S3, obtaining, by the bluetooth device, terminal device information from the connecting request, and determining whether there exists information in an information-matched list matching with the terminal device information, if yes, building a connection and communicating with a terminal device which sends the connecting request, ending the method; otherwise, executing step S4;

step S4, determining, by the bluetooth device, a working mode; in the case that the working mode is the matching mode, matching with and communicating with the terminal device according to the match type, and writing the terminal device information into an information-matched list, and ending the method; in the case that the working mode is the non-matching mode, keeping broadcasting and returning to step S2.

A bluetooth device for indicating a function of a bluetooth device via broadcast data includes:

a determining module, configured to determine a working mode;

a first broadcasting module, configured to, in a case that the working mode determined by the determining module is a matching mode, organize and broadcast bluetooth broadcast data according to an address of the bluetooth device, a universal discoverable identifier and a matching type;

a second broadcasting module, configured to, in a case that the working mode determined by the determining module is a non-matching mode, organize and broadcast the bluetooth broadcast data according to the address of the bluetooth device and a non-discoverable identifier; the second broadcasting module is further configured to keep broadcasting in a case that a third determining module determines that the working mode is the non-matching mode;

a receiving module, configured to receive a connecting request;

a first determining module, configured to determine whether the connecting request is received by the receiving module within a preset duration;

an ending module, configured to end in a case that the first determining module determines that no connecting request is received by the receiving module within the preset duration;

an obtaining module, configured to obtain terminal device information from the connecting request in a case that the first determining module determines that the connecting is received within the preset duration;

a second determining module, configured to determine whether there exists information in an information-matched list matching with the terminal device information obtained by the obtaining module;

a connecting and communicating module, configured to build a connection and communicate with a terminal device which sends the connecting request in a case that the second determining module determines that there exists the information in the information-matched list matching with the terminal device information;

the third determining module is configured to determine the working mode in a case that the second determining module determines that there exists no information in the information-matched list matching with the terminal device information; and a matching and communicating module, configured to, in a case that the third determining module determines that the working mode is the matching mode, match with and communicate with the terminal device according to the matching type, write the terminal device information into the information-matched list and end.

The advantage of the present disclosure lies in that the bluetooth device becomes more secure because of the added non-matching mode, in this way, the bluetooth device cannot be maliciously connected by an unknown device or even an illegal device.

DETAILED DESCRIPTION OF EMBODIMENTS

Figure 1:
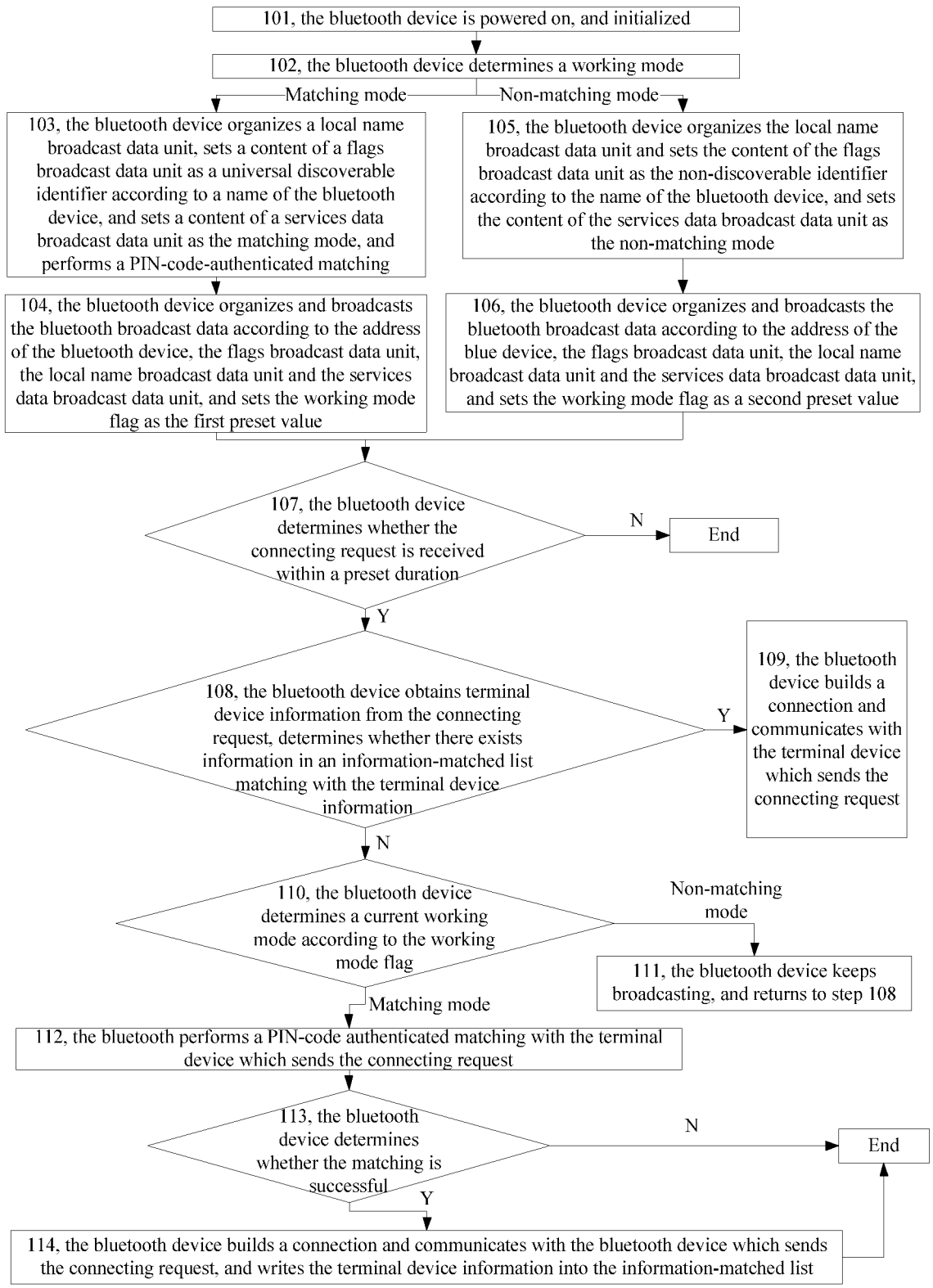
FIG. 1 provides a flow diagram of a method for indicating a function of a bluetooth device via broadcast data according to Embodiment 2 of the present disclosure.

The technical solution in the embodiments of the present disclosure is further described more clearly and completely with drawings of the present disclosure. Apparently, embodiments described herein are just part of embodiments of the present disclosure. On the basis of the embodiments of the present disclosure, all other related embodiments made by those skilled in the art without paying any inventive work belong to the scope of protection of the present disclosure.

Embodiment 1

Provided is a method for indicating a function of a bluetooth device via broadcast data according to Embodiment 1 of the present disclosure, including:

Step S1, the bluetooth device determines a working mode; in a case that the working mode is a matching mode, the bluetooth device organizes and broadcasts bluetooth broadcast data according to an address of the bluetooth device, a universal discoverable identifier and a matching type; in a case that the working mode is a non-matching mode, the bluetooth device organizes and broadcasts the bluetooth broadcast data according to the address of the bluetooth device and a non-discoverable identifier.

Specifically, the bluetooth device determines the working mode includes: the bluetooth device receives external triggering information and determines the working mode according to the external triggering information.

Or, the bluetooth device determines the working mode includes: the bluetooth device determines the working mode according to working mode information received from an external device.

Or, the bluetooth device determines the working mode includes: the bluetooth device obtains a preset working mode.

Specifically, the bluetooth device organizes and broadcasts the bluetooth broadcast data according to the address of the bluetooth device, the universal discoverable identifier and the matching type includes: organizing a flags broadcast data unit according to the universal discoverable identifier, organizing a services data broadcast data unit according to the matching type, and organizing and broadcasting the bluetooth broadcast data according to the address of the bluetooth device, the flags broadcast data unit and the services data broadcast data unit.

The organizing and broadcasting the bluetooth broadcast data according to the address of the bluetooth device and the non-discoverable identifier specifically includes: organizing a flags broadcast data unit according to the non-discoverable identifier, and organizing and broadcasting the bluetooth broadcast data according to the address of the bluetooth device and the flags broadcast data unit.

It needs to be noted that the matching type specifically includes a simple matching or a PIN-code-authenticated matching.

Step S2, the bluetooth device determines whether a connecting request is received within a preset duration, if yes, stops broadcasting and executes step S3, otherwise, ends the method.

Step S3, the bluetooth device obtains terminal device information from the connecting request, and determines whether there exists information in an information-matched list matching with the terminal device information, if yes, builds a connection and communicates with a terminal device which sends the connecting request, ends the method, otherwise, executes step S4;

Step S4, the bluetooth device determines a working mode; in the case that the working mode is the matching mode, the bluetooth device matches with and communicates with the terminal device according to the matching type, and writes the terminal device information into the information-matched list, and ends the method; in the case that the working mode is the non-matching mode, the bluetooth device keeps broadcasting and returns to step S2.

Preferably, step S2 specifically includes: the bluetooth device determines whether the connecting request or a mode switching signal is received within the preset duration, executes step S3 in a case that the connecting request is received; executes step A1 in a case that the mode switching signal is received; ends the method in a case that neither the connecting request nor the mode switching signal is received within the preset duration;

Step A1, the bluetooth device determines the working mode; in the case that the working mode is the matching mode, the bluetooth device organizes and broadcasts the bluetooth broadcast data according to the address of the bluetooth device and the non-discoverable identifier, and switches the working mode to the non-matching mode, returns to step S2; in the case that the working mode is the non-matching mode, the bluetooth device organizes and broadcasts the bluetooth broadcast data according to the address of the bluetooth device, the universal discoverable identifier and the matching type, and switches the working mode to the matching mode, and returns to step S2.

Optionally, step S1 further includes: the bluetooth device sets a working status as a broadcasting status; after the building a connection and communicating with a terminal device which sends the connecting request, step S3 further includes setting the working status as a connecting status, and returning to step S2; in the case that the working mode is the matching mode, step S4 further includes: the bluetooth device sets the working status as the connecting status, and returns to step S2;

Correspondingly, step S2 specifically includes: the bluetooth device determines whether the connecting request or a mode switching signal is received within the preset duration, executes step S3 in a case that the connecting request is received, executes step B1 in a case that the mode switching signal is received; ends the method in a case that neither the connecting request nor the mode switching signal is received within the preset duration;

step B1, the bluetooth device determines the working mode and the working status; in a case that the working mode is the matching mode is the matching mode and the working status is the broadcasting status, keeping broadcasting and returning to step S2; in a case that the working mode is the matching mode and the working status is the connecting status, disconnecting the connection, keeping broadcasting, setting the working status as the broadcasting status and returning to step S2; in a case that the working mode is the non-matching mode and the working status is the broadcasting status, executing step B2; in a case that the working mode is the non-matching mode and the working status is the connecting status, disconnecting the connection, setting the working status as the broadcasting status and executing step B2;

step B2, the bluetooth device organizes and broadcasts the bluetooth broadcast data according to the address of the bluetooth device, the universal discoverable identifier and the matching type, and switches the working mode to the matching mode, and returns to step S2.

Optionally, step S1 further includes: the bluetooth device sets a working status as a broadcasting status; after the building a connection and communicating with the terminal device which sends the connecting request, step S3 further includes setting the working status as a connecting status, and returning to step S2; in the case that the working mode is the matching mode, step S4 further includes: the bluetooth device sets the working status as the connecting status, and returns to step S2;

Corresponding, step S2 specifically includes: the bluetooth device determines whether the connecting request or a mode switching signal is received within the preset duration, executes step S3 in a case that the connecting request is received; executes step C1 in a case that the mode switching signal is received; ends the method in a case that neither the connecting request nor the mode switching signal is received within the preset duration;

step C1, the bluetooth device determines the working mode and the working status; in a case that the working mode is the matching mode and the working status is the broadcasting status, executing step C2; in a case that the working mode is the matching mode and the working status is the connecting status, disconnecting the connecting, setting the working status as the broadcasting status, and executing step C2; in a case that the working mode is the non-matching mode and the working status is the broadcasting status, executing step C3; in a case that the working mode is the non-matching mode and the working status is the connecting status, disconnecting the connection, setting the working status as the broadcasting status and executing step C3;

step C2, the bluetooth device organizes and broadcasts the bluetooth broadcast data according to the address of the bluetooth device and the non-discoverable identifier, and switches the working mode to the non-matching mode, and returns to step S2;

step C3, the bluetooth device organizes and broadcasts the bluetooth broadcast data according to the address of the bluetooth device, the universal discoverable identifier and the matching type, and switches the working mode to the matching mode; and returns to step S2.

It needs to be noted that the switching the working mode to the non-matching mode specifically includes: setting a working mode flag as a second preset value; the switching the working mode to the matching mode specifically comprises: setting the working mode flag as a first preset value.

Preferably, after the determining, by a bluetooth device, a working mode, step S1 further includes: setting a working mode flag according to the working mode; in the case that the working mode is the matching mode, setting the working mode flag as a first preset value; in the case that the working mode is the non-matching mode, setting the working mode flag as a second preset value;

The determining, by the bluetooth device, the working mode specifically includes: determining, by the bluetooth device, the working mode flag; in a case that the working mode flag is the first preset value, determining the working mode to be the matching mode; in a case that the working mode flag is the second preset value, determining the working mode to be the non-matching mode.

Embodiment 2

Provided is a method for indicating a function of a bluetooth device via broadcast data according to Embodiment 2 of the present disclosure, as shown in FIG. 1, the method includes:

Step 101, the bluetooth device is powered on, and initialized.

Step 102, the bluetooth device determines a working mode, executes step 103 in a case that the working mode is a matching mode, and executes step 105 in a case that the working mode is a non-matching mode.

Specifically, the bluetooth device monitors a power-on key, sets the working mode as the matching mode in a case that the power-on key is pressed down for a long time, and sets the working mode as the non-matching mode in a case that the power-on key is pressed down for a short time.

Or, the bluetooth device monitors the number of times for triggering the power-on key, sets the working mode as the non-matching mode in a case that the power-on key is triggered for one time; sets the working mode as the matching mode in a case that the power-on key is triggered for several times.

Or, the bluetooth device determines the working mode according to working mode information received from an external device.

Or, the bluetooth device obtains a preset working mode.

Step 103, the bluetooth device organizes a local name broadcast data unit, sets a content of a flags broadcast data unit as a universal discoverable identifier according to a name of the bluetooth device, and sets a content of a services data broadcast data unit as the matching mode, and performs a PIN-code-authenticated matching.

It needs to be noted that the broadcast data of the bluetooth device includes multiple of broadcast data units AD Structure, for instance, a local name broadcast data unit, a flags broadcast data unit, a services data broadcast data unit, etc.

Furthermore, the broadcast data unit is in a lv data format, i.e., a length of the first byte in the broadcast data unit is len, the next bytes with a length of len in the broadcast data unit are data, where the data is also in the lv format, the first byte of the data is a broadcast data type flag AD Type, for instance, the flags broadcast data unit is used for indicating a function of physical connection of the bluetooth device, the broadcast data type flag of the flags broadcast data unit is 0X01; for instance, the services data broadcast data unit is for indicating data corresponding to the service; the broadcast data type flag of the services data broadcast data unit is 0X04; the next len-1 bytes in the data part are valid data, which is AD data.

In Embodiment 2, when the working mode is the matching mode:

the bluetooth device organizes the local name broadcast data unit according to the name of the bluetooth device, the bluetooth device calculates a length of the local name broadcast data unit 0X 07 according to the broadcast data type flag of the local name broadcast data unit 0X 08 and the name of the bluetooth device 0X 41 42 43 44 45 46, joins in sequence the length of the local name broadcast data unit 0X 07, the broadcast data type flag of the local name broadcast data unit 0X 08 and the name of the bluetooth device 0X 41 42 43 44 45 46 to obtain the local name broadcast data unit 0X 07 08 41 42 43 44 45 46;

the bluetooth device calculates the length of the flag broadcast data 0X 02 according to the broadcast data type of the flags broadcast data unit 0X 01 and a character string of the universal discoverable identifier 0X 06, and joins in sequence the length of the flag broadcast data 0X 02, the broadcast data type of the flags broadcast data unit 0X 01 and the character string of the universal discoverable identifier 0X 06 to obtain the flags broadcast data unit 0X 02 01 06;

the bluetooth device calculates the length of the services data broadcast data unit 0X 04 according to the broadcast data type of the services data broadcast data unit 0X 16, the UUID 0XFF FD of the bluetooth service and an indicator 0X 40 indicating that the bluetooth service supports the matching mode, and joins in sequence the length of the services data broadcast data unit 0X 04, the broadcast data type of the services data broadcast data unit 0X 16, the UUID 0XFF FD of the bluetooth service and an indicator 0XC0 indicating that the bluetooth service supports a PIN-code matching mode to obtain the services data broadcast data unit 0X 04 16 FF FD C0.

Step 104, the bluetooth device organizes and broadcasts the bluetooth broadcast data according to the address of the bluetooth device, the flags broadcast data unit, the local name broadcast data unit and the services data broadcast data unit, and sets the working mode flag as the first preset value.

Specifically, the bluetooth device calculates, based on the address of the bluetooth device, the flags broadcast data unit, the local name broadcast data unit and the services data broadcast data unit, to obtain the length of the bluetooth broadcast data 0X 16, joins in sequence a message header of the bluetooth broadcast data 0X 00, the length of the bluetooth broadcast data 0X 16, the address of the bluetooth device 0X FC F9 86 BE 7C 08, the flags broadcast data unit 0X 02 01 06, the local name broadcast data unit 0X 07 08 41 42 43 44 45 46 and the services data broadcast data unit 0X 04 16 FF FD C0, and adds the length of the joined result to 31 bytes to obtain the bluetooth broadcast data 0X 00 16 FC F9 86 BE 7C 08 02 01 06 07 08 41 42 43 44 45 46 0X 04 16 FF FD C0 00 00 00 00 00 00.

Step 105, the bluetooth device organizes the local name broadcast data unit and sets the content of the flags broadcast data unit as the non-discoverable identifier according to the name of the bluetooth device, and sets the content of the services data broadcast data unit as the non-matching mode.

In Embodiment 2, when the working mode is the non-matching mode:

the bluetooth device organizes the local name broadcast data unit according to the name of the bluetooth device, the bluetooth device calculates, based on the broadcast data type flag of the local name broadcast data unit 0X 08 and the name of the bluetooth device 0X 41 42 43 44 45 46, to obtain the length of the local name broadcast data unit 0X 07, joins in sequence the length of the local name broadcast data unit 0X 07, the broadcast data type flag of the local name broadcast data unit 0X 08 and the name of the bluetooth device 0X 41 42 43 44 45 46 to obtain the local name broadcast data unit 0X 07 08 41 42 43 44 45 46;

the bluetooth device calculates to obtain the length of the flag broadcast data 0X 02 according to the broadcast data type of the flags broadcast data unit 0X 01 and an indicator 0X 04 of the non-discoverable identifier, and joins in sequence the length of the flag broadcast data 0X 02, the broadcast data type of the flags broadcast data unit 0X 01 and the indicator 0X 04 of the discoverable identifier to obtain the flags broadcast data unit 0X 02 01 04;

the bluetooth device calculates to obtain the length of the services data broadcast data unit 0X 04 according to the broadcast data type of the services data broadcast data unit 0X 16, the UUID 0XFF FD of the bluetooth service and an indicator 0X 40 indicating that the bluetooth service supports the matching mode, and joins in sequence the length of the services data broadcast data unit 0X 04, the broadcast data type of the services data broadcast data unit 0X 16, the UUID 0XFF FD of the bluetooth service and an indicator 0X 40 indicating that the bluetooth service is the non-matching mode to obtain the services data broadcast data unit 0X 04 16 FF FD 40.

Step 106, the bluetooth device organizes and broadcasts the bluetooth broadcast data according to the address of the blue device, the flags broadcast data unit, the local name broadcast data unit and the services data broadcast data unit, and sets the working mode flag as a second preset value.

Specifically, the bluetooth device calculates to obtain the length of the bluetooth broadcast data 0X 16 according to the address of the bluetooth device, the flags broadcast data unit, the local name broadcast data unit and the services data broadcast data unit; joins in sequence a message header of the bluetooth broadcast data 0X 00, the length of the bluetooth broadcast data 0X 16, the address of the bluetooth device 0X FC F9 86 BE 7C 08, the flags broadcast data unit 0X 02 01 04, the local name broadcast data unit 0X 07 08 41 42 43 44 45 46 and the services data broadcast data unit 0X 04 16 FF FD 40, and adds the length of the joined result to 31 bytes to obtain the bluetooth broadcast data 0X 00 16 FC F9 86 BE 7C 08 02 01 04 07 08 41 42 43 44 45 46 0X 04 16 FF FD 40 00 00 00 00 00 00.

Step 107, the bluetooth device determines whether the connecting request is received within a preset duration, if yes, executes step 108, otherwise, ends the method.

Specifically, the preset duration is 60 seconds.

Step 108, the bluetooth device obtains terminal device information from the connecting request, determines whether there exists information in an information-matched list matching with the terminal device information, if yes, executes 109, otherwise, executes step 110.

Specifically, the terminal device information may be an unique identification of the terminal device, for instance an MAC address; for instance, the connecting request is 0x01 11 22 33 44 55 66, thus the MAC address of the terminal device obtained by the bluetooth device is 0x11 22 33 44 55 66.

Step 109, the bluetooth device builds a connection and communicates with the terminal device which sends the connecting request.

Step 110, the bluetooth device determines a current working mode according to the working mode flag, executes step 112 in the case that the current working mode is the matching mode, and executes step 111 in the case that the current matching mode is the non-matching mode.

Step 111, the bluetooth device keeps broadcasting, and returns to step 108.

Step 112, the bluetooth performs a PIN-code authenticated matching with the terminal device which sends the connecting request.

Step 113, the bluetooth device determines whether the matching is successful, if yes, executes step 114; otherwise, ends the method.

Step 114, the bluetooth device builds a connection and communicates with the bluetooth device which sends the connecting request, and writes the terminal device information into the information-matched list, and ends the method.

Embodiment 3

Figure 2:
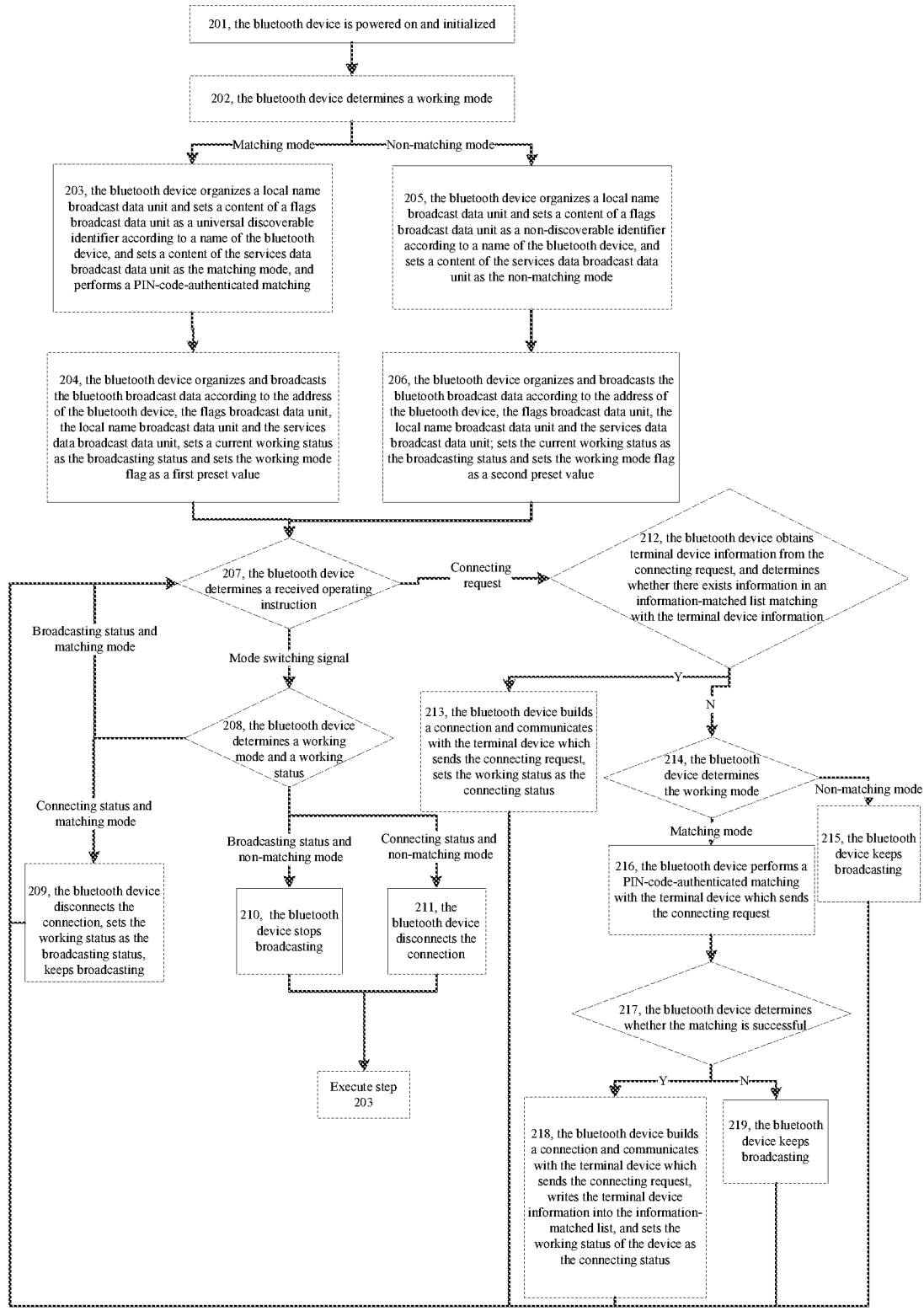
FIG. 2 provides a flow diagram of a method for indicating a function of a bluetooth device via broadcast data according to Embodiment 3 of the present disclosure.

Provided is a method for indicating a function of a bluetooth device via broadcast data according to Embodiment 3 of the present disclosure, as shown in FIG. 2, the method includes:

Step 201, the bluetooth device is powered on and initialized.

Step 202, the bluetooth device determines a working mode; executes step 203 in a case that the working mode is a matching mode, and executes step 205 in a case that the working mode is a non-matching mode.

Specifically, the bluetooth device monitors a power-on key, sets the working mode as the matching mode if the power-on key is pressed down for a long time; sets the working mode as the non-matching mode if the power-on key is pressed down for a short time.

Or, the bluetooth device monitors the number of times for triggering the power-on key, sets the working mode as the non-matching mode in a case that the power-on key is triggered for one time; sets the working mode as the matching mode in a case that the power-on key is triggered for several times.

Or, the bluetooth device determines the working mode according to the working mode information received from an external device.

Or, the bluetooth device obtains the preset working mode.

Step 203, the bluetooth device organizes a local name broadcast data unit and sets a content of a flags broadcast data unit as a universal discoverable identifier according to a name of the bluetooth device, and sets a content of the services data broadcast data unit as the matching mode, and performs a PIN-code-authenticated matching.

In Embodiment 3, in the case that the working mode is the matching mode:

the bluetooth device calculates a length of flag broadcast data 0X 02 according to a broadcast data type of the flags broadcast data unit 0X 01 and a character string of the universal discoverable identifier 0X 06, and joins in sequence the length of the flag broadcast data 0X 02, the broadcast data type of the flags broadcast data unit 0X 01 and the character string of the universal discoverable identifier 0X 06 to obtain the flags broadcast data unit 0X 02 01 06;

the bluetooth device calculates, based on the broadcast data type of the services data broadcast data unit 0X 16, the UUID 0XFF FD of the bluetooth service and an indicator 0X 40 indicating that the bluetooth service supports the matching mode, to obtain the length of the services data broadcast data unit 0X 04, joins in sequence the length of the services data broadcast data unit 0X 04, the broadcast data type of the services data broadcast data unit 0X16, the UUID 0XFF FD of the bluetooth service and an indicator 0XC0 indicating that the bluetooth service supports a PIN-code matching mode to obtain the services data broadcast data unit 04 16 FF FD C0.

Step 204, the bluetooth device organizes and broadcasts the bluetooth broadcast data according to the address of the bluetooth device, the flags broadcast data unit, the local name broadcast data unit and the services data broadcast data unit, sets a current working status as the broadcasting status and sets the working mode flag as a first preset value, executes step 207.

The bluetooth device calculates, based on the broadcast data type of the services data broadcast data unit 0X16, the UUID 0XFF FD of the bluetooth service and an indicator 0X 40 indicating that the bluetooth service supports the matching mode, to obtain the length of the services data broadcast data unit 0X 04, and joins in sequence the length of the services data broadcast data unit 0X 04, the broadcast data type of the services data broadcast data unit 0X16, the UUID 0XFF FD of the bluetooth service and an indicator 0XC0 indicating that the bluetooth service supports a PIN-code matching mode to obtain the services data broadcast data unit 0X 04 16 FF FD C0.

Step 205, the bluetooth device organizes the local name broadcast data unit and sets the content of the flags broadcast data unit as the non-discoverable identifier according to the name of the bluetooth device, and sets the content of the services data broadcast data unit as the non-matching mode.

In Embodiment 3, in the case that the working mode is the non-matching mode:

the bluetooth device organizes the local name broadcast data unit according to the name of the bluetooth device, and calculates, based on the broadcast data type flag of the local name broadcast data unit 0X 08 and the name of the bluetooth device 0X 41 42 43 44 45 46, to obtain the length of the local name broadcast data unit 0X 07, and joins in sequence the length of the local name broadcast data unit 0X 07, the broadcast data type flag of the local name broadcast data unit 0X 08 and the name of the bluetooth device 0X 41 42 43 44 45 46 to obtain the local name broadcast data unit 0X 07 08 41 42 43 44 45 46;

the bluetooth device calculates, based on the broadcast data type of the flags broadcast data unit 0X 01 and an indicator 0X 04 of the non-discoverable identifier, to obtain the length of the flag broadcast data 0X 02, and joins in sequence the length of the flag broadcast data 0X 02, the broadcast data type of the flags broadcast data unit 0X 01 and the indicator 0X 04 of the universal discoverable identifier to obtain the flags broadcast data unit 0X 02 01 04;

the bluetooth device calculates, based on the broadcast data type of the services data broadcast data unit 0X16, the UUID 0XFF FD of the bluetooth service and an indicator 0X 40 indicating that the bluetooth service supports the matching mode, to obtain the length of the services data broadcast data unit 0X 04, and joins in sequence the length of the services data broadcast data unit 0X 04, the broadcast data type of the services data broadcast data unit 0X16, the UUID 0XFF FD of the bluetooth service and the indicator 0X 40 indicating that the bluetooth service supports the non-matching mode to obtain the services data broadcast data unit 0X 04 16 FF FD 40.

Step 206, the bluetooth device organizes and broadcasts the bluetooth broadcast data according to the address of the bluetooth device, the flags broadcast data unit, the local name broadcast data unit and the services data broadcast data unit; sets the current working status as the broadcasting status and sets the working mode flag as a second preset value.

Specifically, the bluetooth device calculates to obtain the length of the bluetooth broadcast data 0X 16 according to the address of the bluetooth device, the flags broadcast data unit, the local name broadcast data unit and the services data broadcast data unit, and joins in sequence a message header of the bluetooth broadcast data 0X 00, the length of the bluetooth broadcast data 0X 16, the address of the bluetooth device 0X FC F9 86 BE 7C 08, the flags broadcast data unit 0X 02 01 04, the local name broadcast data unit 0X 07 08 41 42 43 44 45 46 and the services data broadcast data unit 0X 04 16 FF FD 40, and adds the length of the joined result to 31 bytes to obtain the bluetooth broadcast data 0X 00 16 FC F9 86 BE 7C 08 02 01 04 07 08 41 42 43 44 45 46 0X 04 16 FF FD 40 00 00 00 00 00 00.

Step 207, the bluetooth device determines a received operating instruction, executes step 208 in a case that the received operating instruction is a mode switching signal; and executes step 212 in a case that the received operating instruction is a connecting request.

Specifically, the bluetooth device monitors the power-on key, in the case that the power-on key is pressed for a long time, the bluetooth device determines that the mode switching signal is received; otherwise, keeps monitoring.

Or, the bluetooth device executes step 209 in the case that the bluetooth device receives a mode switching instruction sent from the internal device.

Step 208, the bluetooth device determines a working mode and a working status, returns to step 207 in a case that the working status is the broadcasting status and the working mode is the matching mode; executes step 209 in a case that the working status is the connecting status and the working mode is the matching mode; executes step 210 in a case that the working status is the broadcasting status and the working mode is the non-matching mode; and executes step 211 in a case that the working status is the connecting status and the working mode is the non-matching mode.

Step 209, the bluetooth device disconnects the connection, sets the working status as the broadcasting mode, keeps broadcasting, and returns to step 207.

Step 210, the bluetooth device stops broadcasting and returns to step 203.

Step 211, the bluetooth device disconnects the connection and returns to step 203.

Step 212, the bluetooth device obtains terminal device information from the connecting request, and determines whether there exists information in an information-matched list matching with the terminal device information, if yes, executes step 213; otherwise, executes step 214.

Step 213, the bluetooth device builds a connection and communicates with the terminal device which sends the connecting request, sets the working status as the connecting status; and returns to step 207.

Step 214, the bluetooth device determines the working mode, executes step 216 in the case that the working mode is the matching mode; executes step 215 in the case that working mode is the non-matching mode.

Step 215, the bluetooth device keeps broadcasting and returns step 207.

Step 216, the bluetooth device performs a PIN-code-authenticated matching with the terminal device which sends the connecting request.

Step 217, the bluetooth device determines whether the PIN-code-authenticated matching is successful, if yes, executes step 218; otherwise, executes step 219.

Step 218, the bluetooth device builds a connection and communicates with the terminal device which sends the connecting request, writes the terminal device information into the information-matched list, and sets the working status of the device as the connecting status, and returns to step 207.

Step 219, the bluetooth device keeps broadcasting and returns to step 207.

In the embodiment, in the case that the mode switching signal is received, regardless of which working mode and which the working status the bluetooth device is currently in, the working mode and the working status can be switched to a specific mode (the matching mode) and a specific status (the broadcasting status). In addition to the above-mentioned method, the switched working mode of the bluetooth device can be the non-matching mode and the broadcasting status.

Correspondingly, step 208 may include: the bluetooth device determines the working mode and the working status; returns to step 205 in the case that the working status is the broadcasting status and the working mode is the matching mode; the bluetooth device disconnects the connection and returns to step 205 in the case that the working status is the connecting status and the working mode is the matching mode; returns to step 207 in the case that the working status is the broadcasting status and the working mode is the non-matching mode; the bluetooth device disconnects the connection and sets the working mode as the broadcasting status, keeps broadcasting, and returns to step 207 in the case that the working status is the connecting status and the working mode is the non-matching mode.

Or, step 208 may include: the bluetooth device determines the working status and the working mode; returns to step 205 in the case that the working status is the broadcasting status and the working mode is the matching mode; the bluetooth device disconnects the connection and returns to step 205 in the case that the working status is the connecting status and the working mode is the matching mode; returns to step 203 in the case that the working status is the broadcasting status and the working mode is the non-matching mode; the bluetooth device disconnects the connection and returns to step 203 in the case that the working status is the connecting status and the working mode is the non-matching mode.

It needs to be noted that in the case that the bluetooth device supports a simple matching, step 203 can be instituted as: the bluetooth device organizes the local name broadcast data unit and sets the content of the flags broadcast data unit as the universal discoverable identifier according to the name of the bluetooth device, and sets the content of the services data broadcast data unit as the matching code, and performs the simple matching.

More specifically, the bluetooth device calculates to obtain the length of the flag broadcast data 0X 02 according to the broadcast data type of the flags broadcast data unit 0X 01 and the character string of the universal discoverable identifier 0X 06, and joins in sequence the length of the flag broadcast data 0X 02, the broadcast data type of the flags broadcast data unit 0X 01 and the character string of the universal discoverable identifier 0X 06 to obtain the flags broadcast data unit 0X 02 01 06.

The bluetooth device calculates to obtain the length of the services data broadcast data unit 0X 04 according to the broadcast data type of the services data broadcast data unit 0X16, the UUID 0XFF FD of the bluetooth device and the indicator 0X 40 indicating that the bluetooth service supports the matching mode; and joins in sequence the length of the services data broadcast data unit 0X 04, the broadcast data type of the services data broadcast data unit 0X16, the UUID 0XFF FD of the bluetooth service and an indicator 0X80 indicating that the bluetooth service supports the simple matching to obtain the services data broadcast data unit 0X 04 16 FF FD 80.

The bluetooth device organizes the local name broadcast data unit according to the name of the bluetooth device, the bluetooth device calculates to obtain the length of the local name broadcast data unit 0X 07 according to the broadcast data type flag of the local name broadcast data unit 0X 08 and the name of the bluetooth device 0X 41 42 43 44 45 46, joins in sequence the length of the local name broadcast data unit 0X 07, the broadcast data type flag of the local name broadcast data unit 0X 08 and the name of the bluetooth device 0X 41 42 43 44 45 46 to obtain the local name broadcast data unit 0X 07 08 41 42 43 44 45 46.

The bluetooth device calculates to obtain the length of the bluetooth broadcast data 0X 16 according to the address of the bluetooth device, the flags broadcast data unit, the local name broadcast data unit and the services data broadcast data unit; joins in sequence the massage header of the bluetooth broadcast data 0X 00, the length of the bluetooth broadcast data 0X 16, the address of the bluetooth device 0X FC F9 86 BE 7C 08, the flags broadcast data unit 0X 02 01 06, the local name broadcast data unit 0X 07 08 41 42 43 44 45 46 and the services data broadcast data unit 0X 04 16 FF FD 80, and adds the length of the joined result to 31 bytes to obtain the bluetooth broadcast data 0X 00 16 FC F9 86 BE 7C 08 02 01 04 07 08 41 42 43 44 45 46 0X 04 16 FF FD 80 00 00 00 00 00 00.

In the present disclosure, the bluetooth device becomes more secure because of the added non-discoverable identifier, in this way, the bluetooth device cannot be maliciously connected by an unknown device or even an illegal device. Generally, before pairing between bluetooth devices, the pairing parties need to exchange supported pairing features, such as the input and output capabilities of both parties. When both parties support pairing, a suitable pairing type is selected for pairing. According to the present disclosure, the paring type supported by the bluetooth devices is broadcasted through the bluetooth broadcast data, a terminal determines whether it supports the pairing type according to the pairing type in the broadcast data, performs pairing if it supports the paring type, otherwise ends the process. In this way, both devices are exempt from the process of pairing feature exchanging before pairing, thus improving the efficiency of pairing, rendering it more convenient and quick.

Embodiment 4

Figure 3:
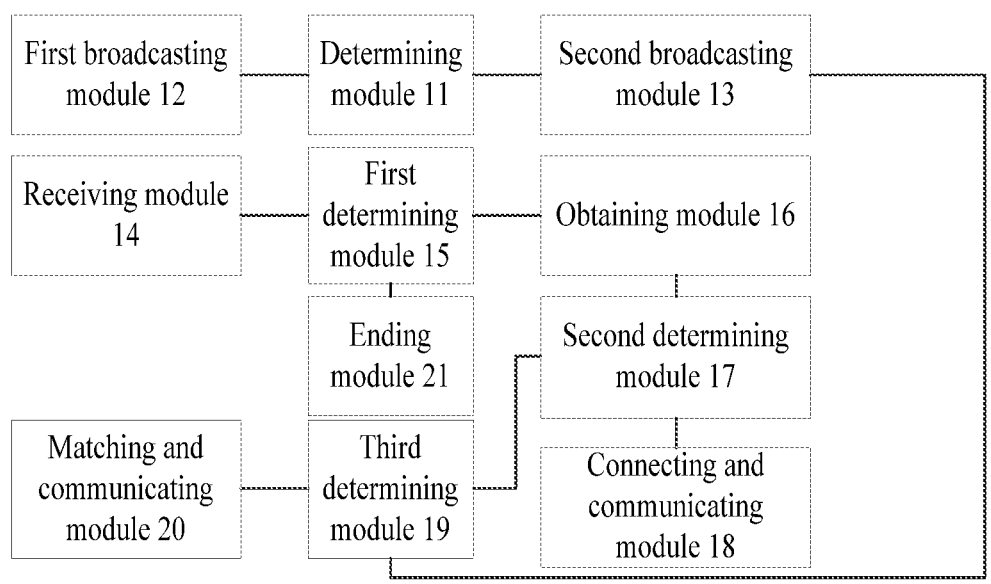
FIG. 3 provides a block diagram of a bluetooth device of indicating a function of a bluetooth device via broadcast data according to Embodiment 4 of the present disclosure.

Provided is a bluetooth device for indicating a function of the bluetooth device via broadcast data, as shown in FIG. 3, the bluetooth device includes:

a determining module 11, configured to determine a working mode;

preferably, the determining module 11 is specifically configured to receive an external trigger information, and determine the working mode according to the external trigger information.

Or, the determining module 11 is specifically configured to determine the working mode according to working mode information received from an external device.

Or, the determining module 11 is specifically configured to obtain a preset working mode.

A first broadcasting module 12, configured to, in a case that the working mode determined by the determining module 11 is a matching mode, organize and broadcast bluetooth broadcast data according to an address of the bluetooth device, a universal discoverable identifier and a matching type.

Specifically, the first broadcasting module 12 is specifically configured to, in the case that the working mode determined by the determining module 11 is the matching mode, organize a flags broadcast data unit according to the universal discoverable identifier, and organize a services data broadcast data unit according to the matching type, and organize and broadcast the bluetooth broadcast data according to the address of the bluetooth device, the flags broadcast data unit and the services data broadcast data unit.

A second broadcasting module 13, configured to, in a case that the working mode determined by the determining module 11 is a non-matching mode, organize and broadcast the bluetooth broadcast data according to the address of the bluetooth device and a non-discoverable identifier; the second broadcasting module 13 is further configured to keep broadcasting in a case that a third determining module 19 determines that the working mode is the non-matching mode.

Specifically, the second broadcasting module 13 is configured to, in the case that the working mode determined by the determining module 11 is the non-matching mode, organize the flags broadcast data unit according to the non-discoverable identifier, and organize and broadcast the bluetooth broadcast data according to the address of the bluetooth device and the flags broadcast data unit.

A receiving module 14, configured to receive a connecting request;

a first determining module 15, configured to determine whether the connecting request is received by the receiving module within a preset duration;

an ending module 21, configured to end in a case that the first determining module 15 determines that no connecting request is received by the receiving module within the preset duration;

an obtaining module 16, configured to obtain terminal device information from the connecting request in a case that the first determining module 15 determines that the connecting request is received within the preset duration;

a second determining module 17, configured to determine whether there exists information in the information-matched list matching with the terminal device information obtained by the obtaining module 16;

a connecting and communicating module 18, configured to build a connection and communicate with a terminal device which sends the connecting request in a case that the second determining module 17 determines that there exists information in the information-matched list matching with the terminal device information;

the third determining module 19 is configured to determine the working mode in a case that the second determining module 17 determines that there exists no information in the information-matched list matching with the terminal device information;

a matching and communicating module 20, configured to, in a case that the third determining module 19 determines that the working mode is the matching mode, match with and communicate with the terminal device according to the matching type, and write the terminal device information into the information-matched list.

Preferably, the bluetooth device further includes a monitoring module, the monitoring module is configured to monitor a mode switching signal;

the first determining module 15 is specifically configured to determine whether the connecting request is received by the receiving module 14 or whether the mode switching signal is monitored by the monitoring module within the preset duration;

the third determining module 19 is further configured to determine the working mode in a case that the first determining module 15 determines that the mode switching signal is received within the preset duration;

the second broadcasting module 13 is further configured to, in the case that the third determining module 19 determines that the working mode is the matching mode, organize and broadcast the bluetooth broadcast data according to the address of the bluetooth device and the non-discoverable identifier, and switch the working mode to the non-matching mode;

the first broadcasting module 12 is further configured to, in the case that the third determining module 19 determines the working mode is the non-matching mode, organize and broadcast the bluetooth broadcast data according to the address of the bluetooth device, the universal discoverable identifier and the matching type, and switch the working mode to the matching mode.

Or, the bluetooth device further includes a monitoring module and a fifth determining module;

the monitoring module is configured to monitor a mode switching signal;

the first determining module 15 is specifically configured to determine whether the connecting request is received by the receiving module 14 or whether the mode switching signal is monitored by the monitoring module within the preset duration;

the ending module 21 is specifically configured to end in a case that the first determining module 15 determines that no connecting request is received by the receiving module and no mode switching signal is received by the monitoring module within the preset duration;

the first broadcasting module 12 is specifically configured to, in the case that the working mode determined by the determining module 11 is the matching mode, organize and broadcast the bluetooth broadcast data according to the address of the bluetooth device, the universal discoverable identifier and the matching type, and set the working status as the broadcasting status;

the second determining module 17 is specifically configured to, in the case that the working mode determined by the determining module 11 is the non-matching mode, organize and broadcast the bluetooth broadcast data according to the address of the bluetooth device and the non-discoverable identifier; the second determining module 17 is further configured to, in the case that the third determining module 19 determines the working mode is the non-matching mode, keep broadcasting and set the working status as the broadcasting status;

the matching and communicating module 20 is specifically configured to, in the case that the third determining module 19 determines that the working mode is the matching mode, match with and communicate with the terminal device according to the matching type, write the terminal device information into the information-matched list, set the working status as the broadcasting status, and trigger the first determining module 15;

the connecting and communicating module 18 is configured to, in the case that the second determining module 17 determines that there exists the information in the information-matched list matching with the terminal device information, build the connection and communicate with the terminal device which sends the connecting request, and set the working status as the connecting status, and trigger the first determining module 15;

the fifth determining module is configured to determining the working mode and the working status in a case that the first determining module 15 determines that the mode switching signal is monitored by the monitoring module within the preset duration;

the first broadcasting module 12 is further configured to: in a case that the fifth determining module determines that the working mode is the matching mode and the working status is the broadcasting status, keep broadcasting; in a case that the fifth determining module determines the working mode is the matching mode and the working status is the connecting status, disconnect the connection and keep broadcasting, and set the working status as the broadcasting status; in a case that the fifth determining module determines that the working mode is the non-matching mode and the working status is the broadcasting status, organize and broadcast the bluetooth broadcast data according to the address of the bluetooth device, the universal discoverable identifier and the matching type, and switch the working mode to the matching mode; in a case that the fifth determining module determines that the working mode is the non-matching mode and the working status is the connecting status, disconnect the connection, and organize and broadcast the bluetooth broadcast data according to the address of the bluetooth device, the universal discoverable identifier and the matching type, and set the working status as the broadcasting status and switch the working mode to the matching mode.

Or, the bluetooth device further includes a monitoring module and a sixth module;

the monitoring module is configured to monitor a mode switching signal;

the first determining module 15 is specifically configured to determine whether the connecting request is received by the receiving module 14 or whether the mode switching signal is monitored by the monitoring module within the preset duration;

the first broadcasting module 12 is specifically configured to, in the case that the working mode determined by the determining module 11 is the matching mode, organize and broadcast the bluetooth broadcast data according to the address of the bluetooth device, the universal discoverable identifier and the matching type, and set a working status as a broadcasting status;

the second broadcasting module 13 is specifically configured to: in the case that the working mode determined by the determining module 11 is the non-matching mode, organize and broadcast the bluetooth broadcast data according to the address of the bluetooth device and the non-discoverable identifier; in the case that the third determining module 19 determines that the working mode is the non-matching mode, keep broadcasting and set the working status as the broadcast status;

the matching and communicating module 20 is specifically configured to, in the case that the third determining module 19 determines that the working mode is the matching mode, match with and communicate with the terminal device according to the matching type, and write the terminal device information into the information-matched list, and set the working status as the broadcasting status, and trigger the first determining module 15;

the connecting and communicating module 18 is configured to, in the case that the second determining module 17 determines that there exists the information in the information-matched list matching with the terminal device information, build the connection and communicate with the terminal which sends the connecting request, and set the working status as the connecting status, and to trigger the first determining module 15;

the sixth determining module is configured to determine the working mode and the working status in a case that the first determining module 15 determines that the mode switching signal is monitored by the monitoring module within the preset duration;

the first broadcasting module 12 is further configured to: in a case that the sixth determining module determines that the working mode is the non-matching mode and the working status is the broadcasting status, organize and broadcast the bluetooth broadcast data according to the address of the bluetooth device, the universal discoverable identifier and the matching type, and switch the working mode to the matching mode; in a case that the sixth determining module determines that the working mode is the non-matching mode and the working status is the connecting status, disconnect the connection, and organize and broadcast the bluetooth broadcast data according to the address of the bluetooth device, the universal discoverable identifier and the matching type, and set the working status as the broadcasting status and switch the working mode to the matching mode;

the second broadcasting module 13 is further configured to: in a case that the sixth determining module determines that the working mode is the matching mode and the working status is the broadcasting status, organize and broadcast the bluetooth broadcast data according to the address of the bluetooth device and the non-discoverable identifier, and switch the working mode to the non-matching mode; in a case that the sixth determining module determines that the working mode is the matching mode and the working status is the connecting status, disconnect the connection, and organize and broadcast the bluetooth broadcast data according to the address of the bluetooth device and the non-discoverable identifier, and set the working status as the broadcasting status, and switch the working mode to the matching mode.

Preferably, the determining module 11 is specifically configured to determine the working mode and set a working mode flag according to the working mode; the determining module 11 sets the working mode flag as a first preset value in the case that the working mode is the matching mode, and sets the working mode flag as a second preset value in the case that the working mode is the non-matching mode;

the third determining module 19 is specifically configured to determine the working mode according to the working mode flag, determine the working mode to be the matching mode in a case that the working mode flag is the first preset value; and determine the working mode to be the non-matching mode in a case that working mode flag is the second preset value.

Although the present disclosure has been described in detail by reference to the preferred embodiments, the scope of protection of the present disclosure is not limited thereto. Various equivalent modifications and substitutions to the embodiments of the present disclosure may be easily made by those skilled in the art without departing from the technical scope disclosed by the present disclosure. Such modifications or substitutions are intended to be within the scope of protection of the present disclosure. Therefore, the scope of protection of the present disclosure is subjected to the scope of protection of the claims.

The invention claimed is:

1. A method for indicating a function of a bluetooth device via broadcast data, comprising:
   step S1, determining, by the bluetooth device, a working mode; in a case that the working mode is a matching mode, organizing and broadcasting bluetooth broadcast data according to an address of the bluetooth device, a universal discoverable identifier and a matching type; in a case that the working mode is a non-matching mode, organizing and broadcasting the bluetooth broadcast data according to the address of the bluetooth device and a non-discoverable identifier;
   step S2, determining, by the bluetooth device, whether a connecting request is received within a preset duration, if yes, stopping broadcasting, and executing step S3; otherwise, ending the method;
   step S3, obtaining, by the bluetooth device, terminal device information from the connecting request, and determining whether there exists information in an information-matched list matching with the terminal device information, if yes, building a connection and communicating with a terminal device which sends the connecting request, and ending the method; otherwise, executing step S4;
   step S4, determining, by the bluetooth device, the working mode; in the case that the working mode is the matching mode, matching with and communicating with the terminal device according to the matching type, and writing the terminal device information into the information-matched list, and ending the method; in the case that the working mode is the non-matching mode, keeping broadcasting and returning to step S2.

2. The method as claimed in claim 1, wherein the determining, by a bluetooth device, of the working mode comprises:
   receiving, by the bluetooth device, external triggering information and determining the working mode according to the external triggering information.

3. The method as claimed in claim 1, wherein the determining, by a bluetooth device, of the working mode comprises:
   determining, by the bluetooth device, the working mode according to working mode information received from an external device.

4. The method as claimed in claim 1, wherein the determining, by a bluetooth device, of the working mode comprises:
   obtaining, by the bluetooth device, a preset working mode.

5. The method as claimed in claim 1, wherein step S2 comprises:
   determining, by the bluetooth device, whether the connecting request or a mode switching signal is received within the preset duration, executing step S3 in a case that the connecting request is received; executing step A1 in a case that the mode switching signal is received; ending the method in a case that neither the connecting request nor the mode switching signal is received within the preset duration;
   step A1, determining, by the bluetooth device, the working mode; in the case that the working mode is the matching mode, organizing and broadcasting the bluetooth broadcast data according to the address of the bluetooth device and the non-discoverable identifier, switching the working mode to the non-matching mode and returning to step S2; in the case that the working mode is the non-matching mode, organizing and broadcasting the bluetooth broadcast data according to the address of the bluetooth device, the universal discoverable identifier and the matching type, switching the working mode to the matching mode and returning to step S2.

6. The method as claimed in claim 5, wherein the switching the working mode to the non-matching mode comprises: setting a working mode flag as a second preset value; and the switching the working mode to the matching mode comprises: setting the working mode flag as a first preset value.

7. The method as claimed in claim 1, wherein step S1 further comprises:
   setting, by the bluetooth device, a working status as a broadcasting status; after the building a connection and communicating with the terminal device which sends the connecting request, step S3 further comprises setting the working status as a connecting status, and returning to step S2; in the case that the working mode is the matching mode, step S4 further comprises setting, by the bluetooth device, the working status as the connecting status, and returning to step S2;
   step S2 comprises: determining, by the bluetooth device, whether the connecting request or a mode switching signal is received within the preset duration, executing step S3 in a case that the connecting request is received; executing step B1 in a case that the mode switching signal is received; ending the method in a case that neither the connecting request nor the mode switching signal is received within the preset duration;

step B1, determining, by the bluetooth device, the working mode and the working status; in a case that the working mode is the matching mode is the matching mode and the working status is the broadcasting status, keeping broadcasting and returning to step S2; in a case that the working mode is the matching mode and the working status is the connecting status, disconnecting the connection, keeping broadcasting, setting the working status as the broadcasting status and returning to step S2; in a case that the working mode is the non-matching mode and the working status is the broadcasting status, executing step B2; in a case that the working mode is the non-matching mode and the working status is the connecting status, disconnecting the connection, setting the working status as the broadcasting status and executing step B2; and step B2, organizing and broadcasting, by the bluetooth device, the bluetooth broadcast data according to the address of the bluetooth device, the universal discoverable identifier and the matching type, switching the working mode to the matching mode, and returning to step S2.

8. The method as claimed in claim 1, wherein step S1 further comprises:

setting, by the bluetooth device, a working status as a broadcasting status; after the building a connection and communicating with the terminal device which sends the connecting request, step S3 further comprises setting the working status as a connecting status, and returning to step S2; in the case that the working mode is the matching mode, step S4 further comprises setting, by the bluetooth device, the working status as the connecting status, and returning to step S2;

step S2 comprises: determining, by the bluetooth device, whether the connecting request or a mode switching signal is received within the preset duration, executing step S3 in a case that the connecting request is received; executing step C1 in a case that the mode switching signal is received; ending the method in a case that neither the connecting request nor the mode switching signal is received within the preset duration;

step C1, determining, by the bluetooth device, the working mode and the working status; in a case that the working mode is the matching mode and the working status is the broadcasting status, executing step C2; in a case that the working mode is the matching mode and the working status is the connecting status, disconnecting the connecting, setting the working status as the broadcasting status, and executing step C2; in a case that the working mode is the non-matching mode and the working status is the broadcasting status, executing step C3; in a case that the working mode is the non-matching mode and the working status is the connecting status, disconnecting the connection, setting the working status as the broadcasting status and executing step C3;

step C2, organizing and broadcasting, by the bluetooth device, the bluetooth broadcast data according to the address of the bluetooth device and the non-discoverable identifier, switching the working mode to the non-matching mode, and returning to step S2; and step C3, organizing and broadcasting, by the bluetooth device, the bluetooth broadcast data according to the address of the bluetooth device, the universal discoverable identifier and the matching type, switching the working mode to the matching mode; and returning to step S2.

9. The method as claimed in claim 1, wherein the organizing and broadcasting the bluetooth broadcast data according to the address of the bluetooth device, the universal discoverable identifier and the matching type comprises: organizing a flags broadcast data unit according to the universal discoverable identifier, organizing a services data broadcast data unit according to the matching type, and organizing and broadcasting the bluetooth broadcast data according to the address of the bluetooth device, the flags broadcast data unit and the services data broadcast data unit.

10. The method as claimed in claim 1, wherein the organizing and broadcasting the bluetooth broadcast data according to the address of the bluetooth device and the non-discoverable identifier comprises: organizing a flags broadcast data unit according to the non-discoverable identifier, and organizing and broadcasting the bluetooth broadcast data according to the address of the bluetooth device and the flags broadcast data unit.

11. The method as claimed in claim 1, wherein the matching type comprises a simple matching or a PIN-code-authenticated matching.

12. The method as claimed in claim 1, wherein after the determining, by a bluetooth device, of the working mode, step S1 further comprises: setting a working mode flag according to the working mode; in the case that the working mode is the matching mode, setting the working mode flag as a first preset value; in the case that the working mode is the non-matching mode, setting the working mode flag as a second preset value;

the determining, by the bluetooth device, of the working mode comprises: determining, by the bluetooth device, the working mode flag; in a case that the working mode flag is the first preset value, determining the working mode to be the matching mode; in a case that the working mode flag is the second preset value, determining the working mode to be the non-matching mode.

13. A bluetooth device for indicating a function of the bluetooth device via broadcast data, comprising:

a determining module, configured to determine a working mode;

a first broadcasting module, configured to, in a case that the working mode determined by the determining module is a matching mode, organize and broadcast bluetooth broadcast data according to an address of the bluetooth device, a universal discoverable identifier and a matching type;

a second broadcasting module, configured to, in a case that the working mode determined by the determining module is a non-matching mode, organize and broadcast the bluetooth broadcast data according to the address of the bluetooth device and a non-discoverable identifier; the second broadcasting module is further configured to keep broadcasting in a case that a third determining module determines that the working mode is the non-matching mode;

a receiving module, configured to receive a connecting request;

a first determining module, configured to determine whether the connecting request is received by the receiving module within a preset duration;

an ending module, configured to end in a case that the first determining module determines that no connecting request is received by the receiving module within the preset duration;

an obtaining module, configured to obtain terminal device information from the connecting request in a case that the first determining module determines that the connecting request is received within the preset duration;

a second determining module, configured to determine whether there exists information in an information-matched list matching with the terminal device information obtained by the obtaining module;

a connecting and communicating module, configured to build a connection and communicate with a terminal device which sends the connecting request in a case that the second determining module determines that there exists the information in the information-matched list matching with the terminal device information;

the third determining module is configured to determine the working mode in a case that the second determining module determines that there exists no information in the information-matched list matching with the terminal device information; and a matching and communicating module, configured to, in a case that the third determining module determines that the working mode is the matching mode, match with and communicate with the terminal device according to the matching type, write the terminal device information into the information-matched list and end.

14. The bluetooth device as claimed in claim 13, wherein the determining module is configured to receive external trigger information and determine the working mode according to the external trigger information.

15. The bluetooth device as claimed in claim 13, wherein the determining module is configured to determine the working mode according to working mode information received from an external device.

16. The bluetooth device as claimed in claim 13, wherein the determining module is configured to obtain a preset working mode.

17. The bluetooth device as claimed in claim 13, further comprising a monitoring module,
the monitoring module is configured to monitor a mode switching signal;
the first determining module is configured to determine whether the connecting request is received by the receiving module or whether the mode switching signal is monitored by the monitoring module within the preset duration;
the third determining module is further configured to determine the working mode in a case that the first determining module determines that the mode switching is received within the preset duration;
the second broadcasting module is further configured to: in the case that the third determining module determines that the working mod is the matching mode, organize and broadcast the bluetooth broadcast data according to the address of the bluetooth device and the non-discoverable identifier, and switch the working mode to the non-matching mode; and
the first broadcasting module is further configured to: in the case that the third determining module determines that the working mode is the non-matching mode, organize and broadcast the bluetooth broadcast data according to the address of the bluetooth device, the universal flag and the matching type, and switch the working mode to the matching mode.

18. The bluetooth device as claimed in claim 13, further comprising a monitoring module and a fifth determining module;
the monitoring module is configured to monitor a mode switching signal;
the first determining module is configured to determine whether the connecting request is received by the receiving module or whether the mode switching signal is monitored by the monitoring module within the preset duration;
the first broadcasting module is configured to, in the case that the working mode determined by the determining module is the matching mode, organize and broadcast the bluetooth broadcast data according to the address of the bluetooth device, the universal discoverable identifier and the matching type, and set a working status as a broadcasting status;
the second broadcasting module is configured to, in the case that the working mode determined by the determining module is the non-matching mode, organize and broadcast the bluetooth broadcast data according to the address of the bluetooth device and the non-discoverable identifier; the second broadcasting module is further configured to: in the case that the third determining module determines that the working mode is the non-matching mode, keep broadcasting and set the working status as the broadcasting status;
the matching and communicating module is configured to, in the case that the third determining module determines that the working mode is the matching mode, match with and communicate with the terminal device according to the matching type, write the terminal device information into the information-matched list, set the working status as the broadcasting status, and trigger the first determining module;
the connecting and communicating module is configured to, in the case that the second determining module determines that there exists the information in the information-matched list matching with the terminal device information, build the connection and communicate with the terminal device which sends the connecting request, and set the working status as the connecting status, and trigger the first determining module;
the fifth determining module is configured to determine the working mode and the working status in a case that the first determining module determines that the mode switching signal is monitored by the monitoring module within the preset duration; and
the first broadcasting module is further configured to: in a case that the fifth determining module determines that the working mode is the matching mode and the working status is the broadcasting status, keep broadcasting; in a case that the fifth determining module determines the working mode is the matching mode and the working status is the connecting status, disconnect the connection and keep broadcasting, and set the working status as the broadcasting status; in a case that the fifth determining module determines that the working mode is the non-matching mode and the working status is the broadcasting status, organize and broadcast the bluetooth broadcast data according to the address of the bluetooth device, the universal discoverable identifier and the matching type, and switch the working mode to the matching mode; in a case that the fifth determining module determines that the working mode is the non-matching mode and the working status is the connecting status, disconnect the connection, and organize and broadcast the bluetooth broadcast data according to the address of the bluetooth device, the universal discoverable identifier and the matching type, and set the working status as the broadcasting status and switch the working mode to the matching mode.

19. The bluetooth device as claimed in claim 13, further comprising a monitoring module and a sixth determining module;
the monitoring module is configured to monitor a mode switching signal;
the first determining module is configured to determine whether the connecting request is received by the receiving module or whether the mode switching signal is monitored by the monitoring module within the preset duration;
the ending module is configured to end in a case that the first determining module determines that no connecting request is received by the receiving module and no mode switching signal is received by the monitoring module within the preset duration;
the first broadcasting module is configured to, in the case that the working mode determined by the determining module is the matching mode, organize and broadcast the bluetooth broadcast data according to the address of the bluetooth device, the universal discoverable identifier and the matching type, and set a working status as a broadcasting status;
the second broadcasting module is configured to: in the case that the working mode determined by the determining module is the non-matching mode, organize and broadcast the bluetooth broadcast data according to the address of the bluetooth device and the non-discoverable identifier; in the case that the third determining module determines that the working mode is the non-matching mode, keep broadcasting and set the working status as the broadcasting status;
the matching and the communicating module is configured to, in the case that the third determining module determines that the working mode is the matching mode, match with and communicate with the terminal device according to the matching type, and write the terminal device information into the information-matched list, and set the working status as the broadcasting status, and trigger the first determining module;
the connecting and communicating module is configured to, in the case that the second determining module determines that there exists the information in the information-matched list matching with the terminal device information, build the connection and communicate with the terminal device which sends the connecting request, and set the working status as the connecting status, and trigger the first determining module;
the sixth determining module is configured to determine the working mode and the working status in a case that the first determining module determines that the mode switching signal is monitored by the monitoring module within the preset duration;
the first broadcasting module is further configured to: in a case that the sixth determining module determines that the working mode is the non-matching mode and the working status is the broadcasting status, organize and broadcast the bluetooth broadcast data according to the address of the bluetooth device, the universal discoverable identifier and the matching type, and switch the working mode to the matching mode; in a case that the sixth determining module determines that the working mode is the non-matching mode and the working status is the connecting status, disconnect the connection, and organize and broadcast the bluetooth broadcast data according to the address of the bluetooth device, the universal discoverable identifier and the matching type, and set the working status as the broadcasting status and switch the working mode to the matching mode; and
the second broadcasting module is further configured to: in a case that the sixth determining module determines that the working mode is the matching mode and the working status is the broadcasting status, organize and broadcast the bluetooth broadcast data according to the address of the bluetooth device and the non-discoverable identifier, and switch the working mode to the non-matching mode; in a case that the sixth determining module determines that the working mode is the matching mode and the working status is the connecting status, disconnect the connection, and organize and broadcast the bluetooth broadcast data according to the address of the bluetooth device and the non-discoverable identifier, and set the working status as the broadcasting status, and switch the working mode to the matching mode.

20. The bluetooth device as claimed in claim 13, wherein the first broadcasting module is configured to: in the case that the working mode determined by the determining module is the matching mode, organize a flags broadcast data unit according to the universal discoverable identifier, organize a services data broadcast data unit according to the matching type, and organize and broadcast the bluetooth broadcast data according to the address of the bluetooth device, the flags broadcast data unit and the services data broadcast data unit.

21. The bluetooth device as claimed in claim 13, wherein the second broadcasting module is configured to: in the case that the working mode determined by the determining module is the non-matching mode, organize a flags broadcast data unit according to the non-discoverable identifier, and organize and broadcast the bluetooth broadcast data according to the address of the bluetooth device and the flags broadcast data unit.

22. The bluetooth device as claimed in claim 13, wherein the determining module is configured to determine the working mode, and set a working mode flag according to the working mode; set the working mode flag as a first preset value in the case that the working mode is the matching mode, and set the working mode flag as a second preset value in the case that the working mode is the non-matching mode; and
the third determining module is configured to determine the working mode according to the working mode flag, determine the working mode to be the matching mode in a case that the working mode flag is the first preset value; and determine the working mode to be the non-matching mode in a case that working mode flag is the second preset value.

* * * * *